United States Patent
Tsujimoto (10) Patent No.: US 8,118,493 B2
(45) Date of Patent: Feb. 21, 2012

(54) TAPERED ROLLER BEARING

(75) Inventor: Takashi Tsujimoto, Iwata (JP)

(73) Assignee: NTN Corporation, Osaka (JP)

( * ) Notice: Subject to any disclaimer, the term of this patent is extended or adjusted under 35 U.S.C. 154(b) by 817 days.

(21) Appl. No.: 11/629,166

(22) PCT Filed: Jun. 16, 2005

(86) PCT No.: PCT/JP2005/011030
§ 371 (c)(1),
(2), (4) Date: Aug. 26, 2008

(87) PCT Pub. No.: WO2006/003793
PCT Pub. Date: Jan. 12, 2006

(65) Prior Publication Data
US 2009/0016664 A1  Jan. 15, 2009

(30) Foreign Application Priority Data
Jul. 5, 2004  (JP) ................ 2004-227330

(51) Int. Cl.
*F16C 33/64* (2006.01)
(52) U.S. Cl. .................. 384/571; 384/625; 384/572
(58) Field of Classification Search .................. 384/571, 384/569, 572, 625
See application file for complete search history.

(56) References Cited

U.S. PATENT DOCUMENTS

| | | | |
|---|---|---|---|
| 4,893,387 A | 1/1990 | Akamatsu et al. | |
| 5,039,231 A | 8/1991 | Kispert et al. | |
| 5,064,298 A * | 11/1991 | Hibi et al. | 384/625 |
| 7,296,933 B2 | 11/2007 | Tsujimoto | |
| 2003/0185478 A1 | 10/2003 | Doll et al. | |
| 2007/0280574 A1 | 12/2007 | Tsujimoto | |

FOREIGN PATENT DOCUMENTS

| | | |
|---|---|---|
| EP | 1 698 789 | 9/2005 |
| JP | 64-79419 | 3/1989 |
| JP | 1-30008 | 6/1989 |
| JP | 3-69823 | 3/1991 |
| JP | 3-117725 | 5/1991 |
| JP | 7-269573 | 10/1995 |
| JP | 9-79270 | 3/1997 |
| JP | 10-131970 | 5/1998 |
| JP | 11-210765 | 8/1999 |

(Continued)

OTHER PUBLICATIONS

Japanese Office Action dated Jun. 9, 2010 in JP 2004-227330 (with English translation).

(Continued)

*Primary Examiner* — Thomas R Hannon
(74) *Attorney, Agent, or Firm* — Wenderoth, Lind & Ponack, L.L.P.

(57) ABSTRACT

A tapered roller bearing includes an inner ring, an outer ring, a plurality of tapered rollers which are rollably disposed between the inner ring and the outer ring, and a retainer which retains the tapered rollers at predetermined circumferential intervals. In this tapered roller bearing, a roller coefficient γ=(the number of rollers×average roller diameter) exceeds 0.94, a number of indentations having a micro recess-like shape are randomly provided at least on a surface of the tapered roller, a surface roughness parameter Ryni of the surface having the indentations falls within a range of 0.4 μm≦Ryni≦1.0 μm, and an Sk value is −1.6 or less.

16 Claims, 7 Drawing Sheets

FOREIGN PATENT DOCUMENTS

| | | |
|---|---|---|
| JP | 2000-240661 | 9/2000 |
| JP | 2002-276672 | 9/2002 |
| JP | 2003028165 A * | 1/2003 |
| JP | 2005-188738 | 7/2005 |

OTHER PUBLICATIONS

International Search Report issued Sep. 20, 2005 in International (PCT) Application No. PCT/JP2005/011030.

International Preliminary Report on Patentability and Written Opinion of the International Searching Authority dated Jan. 16, 2007 in PCT/JP2005/011030.

European Office Action issued Sep. 19, 2007 in corresponding European Application No. 05 751 508.2.

English translation for Japanese Patent Application Publication 11-210765, published Aug. 3, 1999.

* cited by examiner

| Bearing | Roller coefficient | Lifetime | Remarks |
|---|---|---|---|
| Comparative Example 1 (conventional product, iron plate-made retainer) | 0.86 | 16.4 hours | Inner ring flaking |
| Comparative Example 2 (bearing of Patent Document 1, iron plate-made retainer) | 0.96 | 40.2 hours | Stopped by torque increase due to retainer wear |
| Example | 0.96 | 200 hours or more | Nothing abnormal, terminated |

JIS calculated time = 92.2 hours

Time

FIG. 10B

Time

TAPERED ROLLER BEARING

BACKGROUND OF THE INVENTION

1. Field of the Invention

The present invention relates to a tapered roller. This tapered roller is applicable to, for example, a tapered roller bearing employed in a shaft supporting portion of a transmission of automobiles.

2. Description of the Related Art

In recent years, ATs and CVTs are increasingly used as automobile transmissions, and there is a tendency to use low viscosity oil in the transmissions in order to improve fuel efficiency. In the environment in which low viscosity oil is used, very short-life surface-originated flaking caused by poor lubrication may occur on the inner ring raceway surface receiving high contact pressure when the following adverse conditions are simultaneously present: (1) the temperature of the oil is high; (2) the amount of the oil is small; and (3) loss of preload occurs.

A direct and effective solution for the reduction in life due to the surface-originated flaking is to reduce maximum contact pressure. In order to reduce the maximum contact pressure, the dimensions of a bearing are changed, or the number of rollers of the bearing is increased when the dimensions of the bearing are not changed. In order to increase the number of rollers without reducing the diameter of the rollers, the distance between pockets of a retainer must be reduced. Therefore, the size of the pitch circle of the retainer must be increased to bring the retainer as close to an outer ring as possible.

Figure 7:
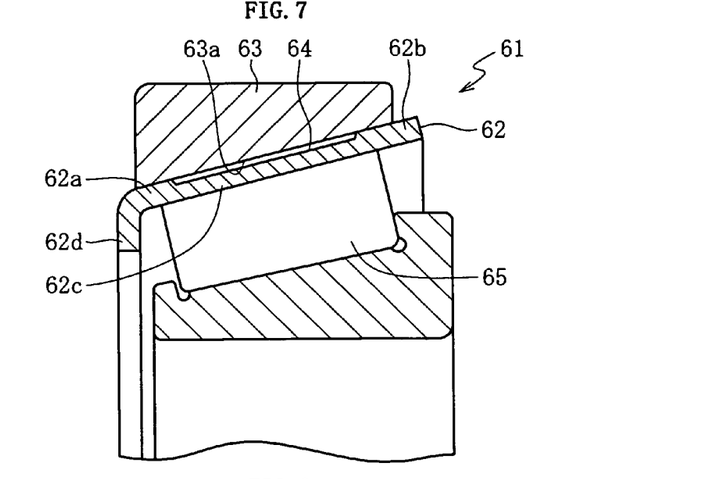
FIG. 7 is a cross-sectional view of a conventional tapered roller bearing in which a retainer is brought on the side of an outer ring.

FIG. 7 shows a tapered roller bearing (see Japanese Patent Laid-Open Publication No. 2003-28165) as an example in which a retainer is brought close to an outer ring until the retainer is brought into contact with the inner diameter surface of the outer ring. In this tapered roller bearing 61, the outer peripheral surface of a small-diameter-side annular portion 62a of a retainer 62 and the outer peripheral surface of a larger-diameter-side annular portion 62b of the retainer are brought into sliding contact with the inner diameter surface of an outer ring 63 to thereby guide the retainer 62. Furthermore, a recess 64 is formed in the outer diameter surface of a pillar portion 62c of the retainer 62 in order to suppress dragging torque, thereby maintaining a non-contact state between the outer diameter surface of the pillar portion 62c and a raceway surface 63a of the outer ring 63. The retainer 62 has the small-diameter-side annular portion 62a, the larger-diameter-side annular portion 62b, and a plurality of the pillar portions 62c each of which axially connects the small-diameter-side annular portion 62a and the larger-diameter-side annular portion 62b and has the recess 64 formed in the outer diameter surface thereof. Furthermore, a plurality of pockets for rollably receiving a tapered roller 65 is provided between the plurality of the pillar portions 62c. In the small-diameter-side annular portion 62a, a flange portion 62d integrally extending inward is provided. The tapered roller bearing shown in FIG. 7 is designed to improve the strength of the retainer 62. In addition, this tapered roller bearing is an example in which the retainer 62 is brought close to the outer ring 63 until the retainer 62 is brought into contact with the inner diameter surface of the outer ring 63 in order to increase the circumferential width of the pillar portion 62c of the retainer 62.

In recent years, automobile transmissions and other parts in which a roller bearing is employed are becoming increasingly small, and the output power thereof is more and more increased. Therefore, the viscosity of lubricating oil is reduced, and in the use environment of the lubricating oil, the load on and temperature of a roller bearing tend to increase. Therefore, the lubrication environment of bearings becomes more severe than ever, and wear and surface-originated flaking due to poor lubrication are much more likely to occur.

In each of Japanese Patent Laid-Open Publications Nos. Hei 2-168021 and Hei 6-042536, a roller bearing is described in which minute irregularities are formed on the surface of a rolling element to improve the ability to form an oil film. Such conventional indentations having a micro recess-like shape are formed such that, when the surface roughness is represented by a parameter Rqni, the value of the ratio of an axial surface roughness Rqni(L) to a circumferential surface roughness Rqni(C) (i.e., Rqni(L)/Rqni(C)) is 1.0 or lower (Rqni≧0.10), and that the value of a surface roughness parameter Sk is −1.6 or less. Hence, not only when a surface to be brought into contact with the rolling element is a rough surface but also when this surface is a well-finished surface, a long life is obtained. However, the thickness of an oil film is extremely small under the conditions of low viscosity-lean lubrication. In this case, the effects of the indentations may not be sufficiently obtained.

Figure 8:
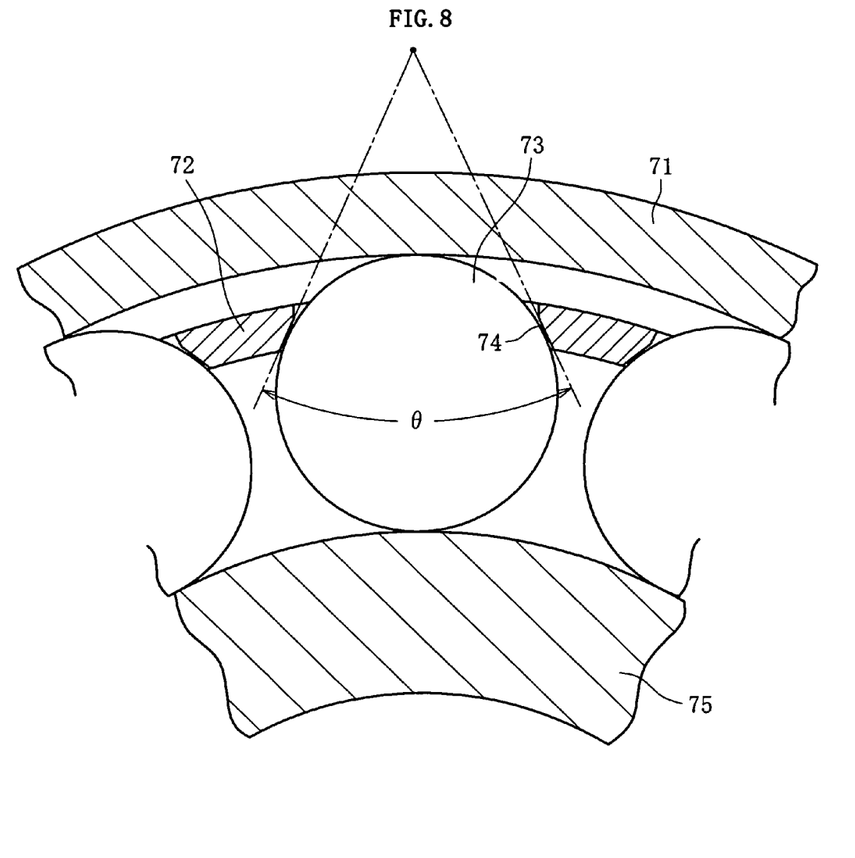
FIG. 8 is a partial enlarged cross-sectional view of another conventional tapered roller bearing.

In the tapered roller bearing 61 described in Japanese Patent Laid-Open Publication No. 2003-28165, the retainer 62 is brought in the outward direction until the retainer 62 is brought into contact with the inner diameter surface of the outer ring 63 to thereby increase the circumferential width of the pillar portion 62c of the retainer 62. Furthermore, since the pillar portion 62c of the retainer 62 has the recess 64, the thickness thereof is necessarily decreased to cause the reduction of the stiffness of the retainer 62. Therefore, for example, stresses at the time of the assembly of the bearing 61 may cause deformation of the retainer 62, and the retainer 62 may be deformed during the rotation of the bearing 61. Meanwhile, in a conventional tapered roller bearing with a typical retainer other than the tapered roller bearing described in Patent Document 1, an outer ring 71 is prevented from being in contact with a retainer 72 as shown in FIG. 8. Furthermore, in order to ensure the pillar width of the retainer 72 and to obtain suitable pillar strength of the retainer 72 and smooth rotation, this tapered roller bearing is designed such that a roller coefficient γ (the filling factor of rollers) defined by the following equation is normally 0.94 or less.

Roller coefficient $\gamma=(Z\times DA)/(\pi\times PCD)$. Here, Z is the number of rollers, DA is the average diameter of the rollers, and PCD is the diameter of the pitch circle of the rollers.

Furthermore, in FIG. 8, reference numeral 73 represents a tapered roller, and reference numeral 74 represents a pillar surface. Reference numeral 75 represents an inner ring, and symbol θ represents a window angle.

SUMMARY OF THE INVENTION

It is an object of the present invention to prevent early failure due to an increase in load capacity and excessive contact pressure on a raceway surface.

A tapered roller bearing of the invention includes an inner ring, an outer ring, a plurality of tapered rollers which are rollably disposed between the inner ring and the outer ring, and a retainer which retains the tapered rollers at predetermined circumferential intervals. In the tapered roller bearing, a roller coefficient γ exceeds 0.94, a number of indentations having a micro recess-like shape are randomly provided at least on a surface of a rolling element, a surface roughness parameter Ryni of the surface having the indentations falls within a range of 0.4 μm≦Ryni≦1.0 μm, and an Sk value is −1.6 or less.

Here, the parameter Ryni is the average value of maximum heights for each reference length. Specifically, portions having the reference length in an averaging line direction are extracted from a roughness curve, and the distance between a peak line and a bottom line in each of the extracted portions is measured along the vertical magnification direction of the roughness curve (ISO 4287: 1997).

The parameter Sk represents the skewness of the roughness curve (ISO 4287: 1997) and is a statistic indicating the asymmetricity of the irregularity distribution. The Sk value is close to zero for a symmetric distribution such as a Gaussian distribution. Furthermore, the Sk value is negative when projecting portions are eliminated from the irregularities and is positive in the reverse case. The Sk value can be controlled by selecting the rotation speed of a barrel polishing apparatus, processing time, the amount of work fed, the type and size of chips, and the like. By adjusting the Sk values in the width and circumferential directions to −1.6 or less, the indentations having a micro recess-like shape serve as an oil sump, and thus the amount of oil leakage is small in a sliding direction and in a direction orthogonal to the sliding direction even during compression. Therefore, the following effects are obtained: the ability to form an oil film is excellent; the status of the formed oil film is excellent; and surface damage is suppressed as much as possible.

Preferably, a surface roughness parameter Rymax of the surface having the indentations falls within the range of 0.4 to 1.0. Here, the parameter Rymax is a maximum value of the maximum heights for each reference length (ISO 4287: 1997).

Preferably, when the surface roughness of the surface having the indentations is represented by a parameter Rqni, a value of a ratio of an axial surface roughness Rqni(L) to a circumferential surface roughness Rqni(C), Rqni(L)/Rqni(C), is 1.0 or less. The parameter Rqni is a square root of a value which is obtained by integrating the square of a height deviation from the center line of roughness to a roughness curve over a measurement length interval and averaging the integrated value over the interval. The parameter Rqni is also referred to as root mean square roughness. The Rqni is determined by numerical calculation from a cross-sectional curve and the roughness curve which are enlarged and recorded, and the measurement is performed by moving a stylus of a roughness meter in a width direction and in a circumferential direction.

Preferably, a window angle of a pocket is set to 55° or more and 80° or less. The "window angle" is an angle formed by guide surfaces of pillar portions abutting on the peripheral surface of a single roller. The reason for setting the window angle to 55° or more is for ensuring a good contact state with the roller. Furthermore, the reason for setting the window angle to 80° or less is that, when the window angle exceeds 80°, the pressing force in the radial direction increases to thereby cause the risk that smooth rotation cannot be obtained even when a self-lubricating resin material is employed. Moreover, in an ordinary retainer, the window-angle is 25° to 50°.

Preferably, the retainer is composed of engineering plastic excellent in mechanical strength, oil resistance, and heat resistance. A retainer composed of a resin material has characteristics of a lighter retainer weight, better self-lubricating properties, and a smaller friction coefficient as compared to a retainer made of an iron plate. These characteristics are combined with the effects of lubricating oil present in the bearing, whereby the occurrence of wear due to contact with the outer ring can be suppressed. Such a resin material has a lighter weight and a lower friction coefficient as compared with a steel plate and thus is suitable for reducing torque loss and wear of the retainer at the time of starting the bearing.

Examples of the engineering plastic include general purpose engineering plastics and super engineering plastics. Representative examples of the engineering plastic are listed below. However, these are by way of example only, and the engineering plastic is not limited thereto.

[General Purpose Engineering Plastics]

Polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), and ultra high molecular weight polyethylene (UHMW-PE).

[Super Engineering Plastics]

Polysulfone (PSF), polyether sulfone (PES), polyphenylene sulfide (PPS), polyarylate (PAR), polyamideimide (PAI), polyetherimide (PEI), polyether-etherketone (PEEK), liquid crystal polymer (LCP), thermoplastic polyimide (TPI), polybenzimidazole (PBI), polymethylpentene (TPX), poly-(1,4-cyclohexane dimethylene terephthalate) (PCT), polyamide 46 (PA46), polyamide 6T (PA6T), polyamide 9T (PA9T), polyamide 11, 12 (PA11, 12), fluororesin, and polyphthalamide (PPA).

According to the present invention, by setting the roller coefficient γ of the tapered roller bearing to γ>0.94, not only the load capacity can be increased, but also the maximum contact pressure on the raceway surface can be reduced. Therefore, the occurrence of very short-life surface-originated flaking under severe lubricating conditions can be prevented. Furthermore, by randomly providing a large number of indentations having a micro recess-like shape at least on the surface of the tapered rollers, the ability to form an oil film is improved, and therefore long life is obtained even when the thickness of the oil film is extremely small under the conditions of low viscosity-lean lubrication. In particular, the surface roughness parameter Ryni of the surface having the indentations is set within the range of $0.4\,\mu m \leqq Ryni \leqq 1.0\,\mu m$, which is smaller than that in the conventional case. Hence, oil film disruption can be prevented even under the conditions of lean lubrication, and therefore long life can be obtained even under the conditions of extremely small oil film thickness as compared to a conventional product. The Sk value range advantageous for the formation of the oil film is −1.6 or less, and the Sk value is controlled by selecting the shape and distribution of the surface recessed portions and processing conditions.

These and other objects and features of the invention will become more apparent as the description proceeds with reference to the accompanying drawings.

DETAILED DESCRIPTION OF THE PREFERRED EMBODIMENTS

Hereinafter, embodiments of the present invention will be described with reference to FIGS. 1A to 4.

Figure 1A:
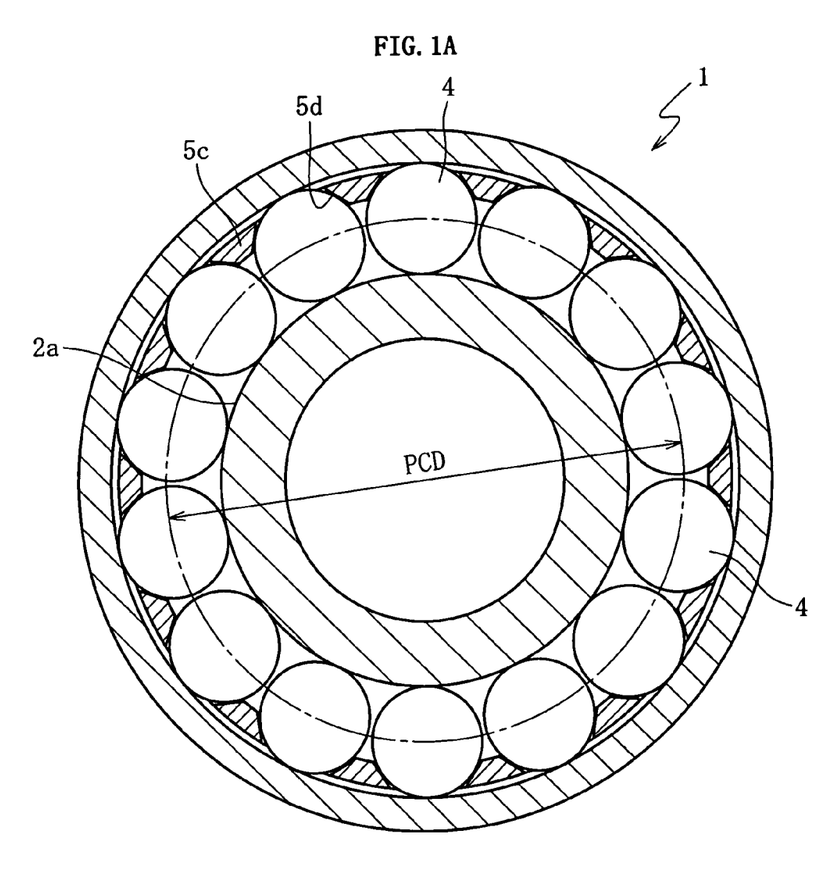
FIG. 1A is a horizontal cross-sectional view of a tapered roller bearing of the present invention.
Figure 1B:
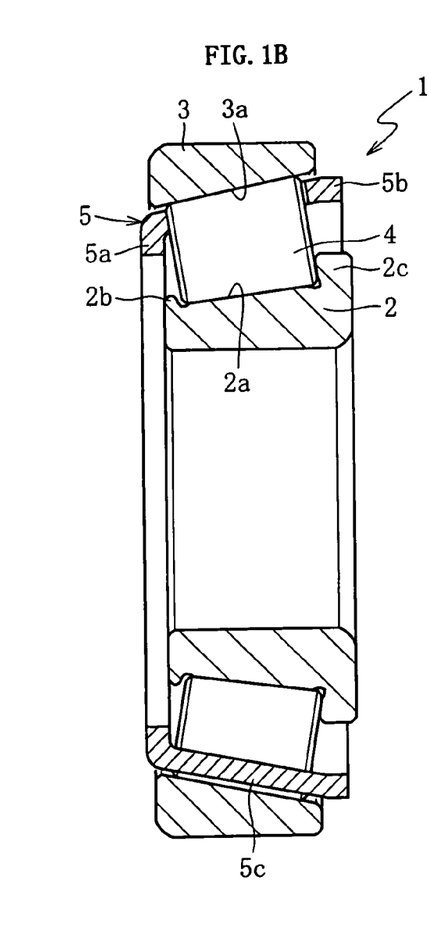
FIG. 1B is a vertical cross-sectional view of the bearing shown in FIG. 1A.

A tapered roller bearing 1 of an embodiment shown in FIGS. 1A and 1B has a tapered raceway surface 2a and comprises: an inner ring 2 which has a smaller flange portion 2b on the smaller diameter side of the raceway surface 2a and a larger flange portion 2c on the larger diameter side; an outer ring 3 which has a tapered raceway surface 3a; a plurality of tapered rollers 4 which are rollably disposed between the raceway surface 2a of the inner ring 2 and the raceway surface 3a of the outer ring 3; and a retainer 5 which retains the tapered rollers 4 at regular circumferential intervals. Here, the tapered roller bearing 1 has a roller coefficient γ of more than 0.94.

The retainer 5 is formed by integral molding of a super engineering plastic such as PPS, PEEK, PA, PPA, or PAI, and has a smaller-diameter-side annular portion 5a, a larger-diameter-side annular portion 5b, and a plurality of pillar portions 5c which axially connect the smaller-diameter-side annular portion 5a and the larger-diameter-side annular portion 5b. As the material for the retainer, in addition to a super engineering plastic such as PPS, PEEK, PA, PPA, or PAI, a material may be employed in which glass fibers or carbon fibers are added to such a resin material or other engineering plastic in order to enhance the strength in accordance with need.

Figure 2:
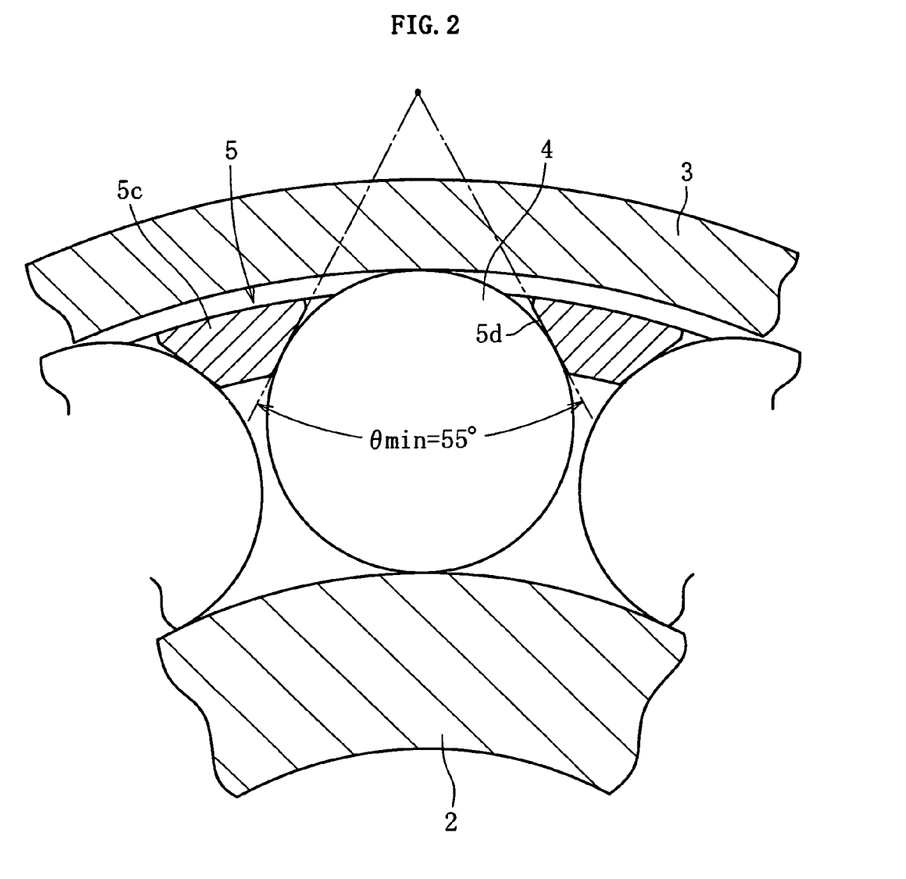
FIG. 2 is a partial enlarged cross-sectional view of a tapered roller bearing having a minimum window angle.
Figure 3:
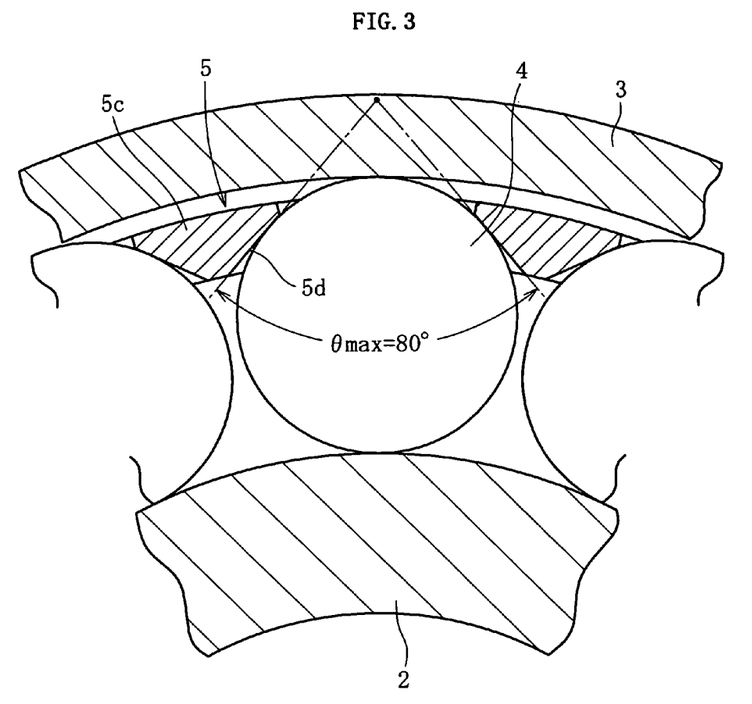
FIG. 3 is a partial enlarged cross-sectional view of a tapered roller bearing having a maximum window angle.

As for a window angle θ of a pillar surface 5d, a minimum window angle θmin is 55° as shown in FIG. 2, and a maximum window angle θmax is 80° as shown in FIG. 3. In a tapered roller bearing with a typical retainer separated from an outer ring as shown in FIG. 8, the window angle is approximately 50° at most. The reason for setting the minimum window angle θmin to 55° or more is for ensuring a good contact state with the roller. When the window angle is less than 55°, the contact state with the roller is poor. Specifically, when the window angle is 55° or more, the roller coefficient γ can be set to γ>0.94 while the strength of the retainer is ensured. In addition to this, a good contacting state can be ensured. Furthermore, the reason for setting the maximum window angle θmax to 80° or less is that, when the window angle exceeds 80°, the pressing force in the radial direction increases to thereby cause the risk that smooth rotation cannot be obtained even when a self-lubricating resin material is employed.

Figure 4:
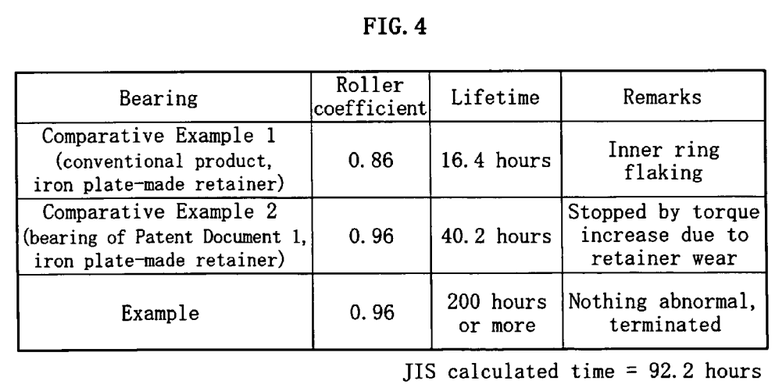
FIG. 4 is a drawing showing the results of life test for bearings.

FIG. 4 shows the results of life test for bearings. In FIG. 4, "Comparative Example" in the "bearing" column corresponds to a conventional typical tapered roller bearing in which a retainer is separated from an outer ring. "Example 1" corresponds to one of the tapered roller bearings of the present invention. This tapered roller bearing is similar to the conventional tapered roller bearing except that only the roller coefficient γ is changed to γ>0.94. "Example 2" corresponds to another tapered roller bearing of the present invention having a roller coefficient γ of less than 0.94 and a window angle within the range of 55° to 80°. The tests were performed under the conditions of severe lubrication and excessive load. As is clear from FIG. 4, "Example 1" has a long life which is twice or more the life of the "Comparative Example." Furthermore, the bearing of "Example 2" has a roller coefficient of 0.96, which is the same as in "Example 1." However, the life of "Example 2" is about five times or more that of "Example 1." Here, the dimensions in each of the "Comparative Example," "Example 1," and "Example 2" are φ45×φ81×16 (in mm), and the number of rollers is 24 for the "Comparative Example" and 27 for "Examples 1 and 2." Further, an oil film parameter Λ is 0.2.

Next, a modified example of the present invention is described with reference to FIGS. 5 and 6. In the tapered roller bearing 1 shown in FIGS. 5 and 6, a convex-shaped projecting portion 5f projecting toward the outer ring raceway surface is formed on the outer diameter surface of the pillar portions 5c of the retainer 5 formed by integral molding of an engineering plastic. The rest of the configuration is the same as that of the retainer 5 described above. As shown in FIG. 6, this projecting portion 5f has an arc-like outline shape in a cross-section taken along the direction crossing the pillar portion 5c. The arc-like shape is formed to have a radius of curvature $R_2$ smaller than the radius $R_1$ of the raceway surface of the outer ring. The reason for this is to form a wedge-like oil film between the projecting portion 5f and the raceway surface of the outer ring. It is desirable that the projecting portion be formed to have a radius of curvature $R_2$ of 70 to 90% of the radius $R_1$ of the raceway surface of the outer ring. When the radius of curvature $R_2$ is less than 70% of the radius $R_1$, the inlet opening angle of the wedge-like oil film becomes too large, thereby reducing the dynamic pressure. Furthermore, when the radius of curvature $R_2$ exceeds 90% of the radius $R_1$, the inlet angle of the wedge-like oil film becomes too small, thereby also reducing the dynamic pressure. In addition to this, it is desirable that the projecting portion 5f be formed to have a lateral width $W_2$ of 50% or more of the lateral width $W_1$ of the pillar portions 5c ($W_2 \geq 0.5 \times W_1$). When the lateral width $W_2$ is less than 50% of the lateral width $W_1$, a sufficient height for forming a good wedge-like oil film cannot be ensured in the projecting portion 5f. Moreover, the radius $R_1$ of the raceway surface of the outer ring continuously changes from the larger diameter side to the smaller diameter side. Therefore, the projecting portion 5f is formed such that the radius of curvature $R_2$ thereof continuously changes from a larger radius of curvature $R_2$ of the larger-diameter-side annular portion 5b to a smaller radius of curvature $R_2$ of the smaller-diameter-side annular portion 5a so as to follow the change of the radius $R_1$.

Figure 5:
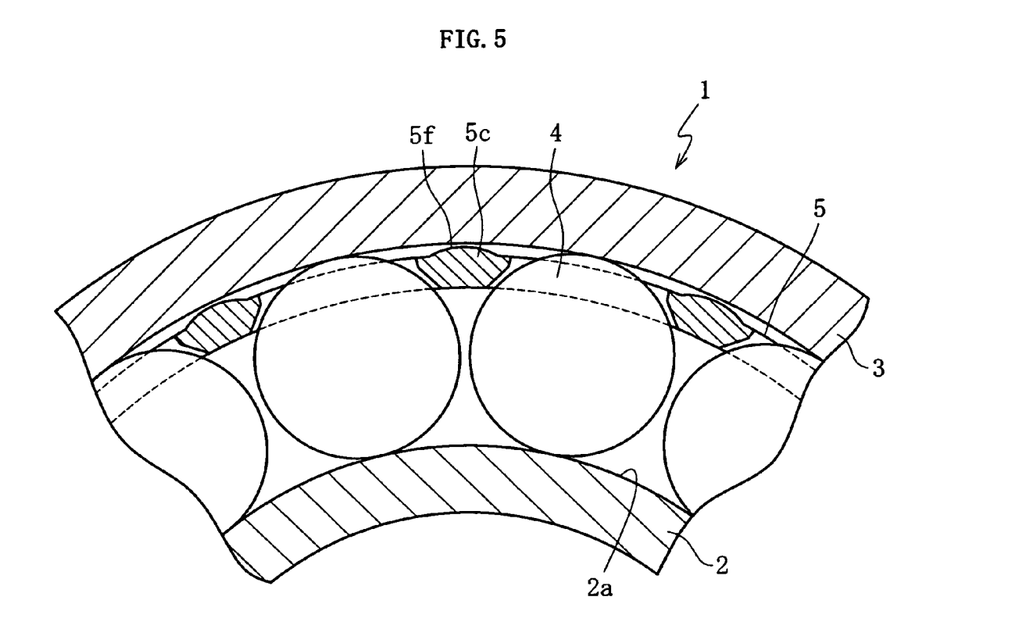
FIG. 5 is a partial cross-sectional view of a tapered roller bearing according to a modified example of the present invention.
Figure 6:
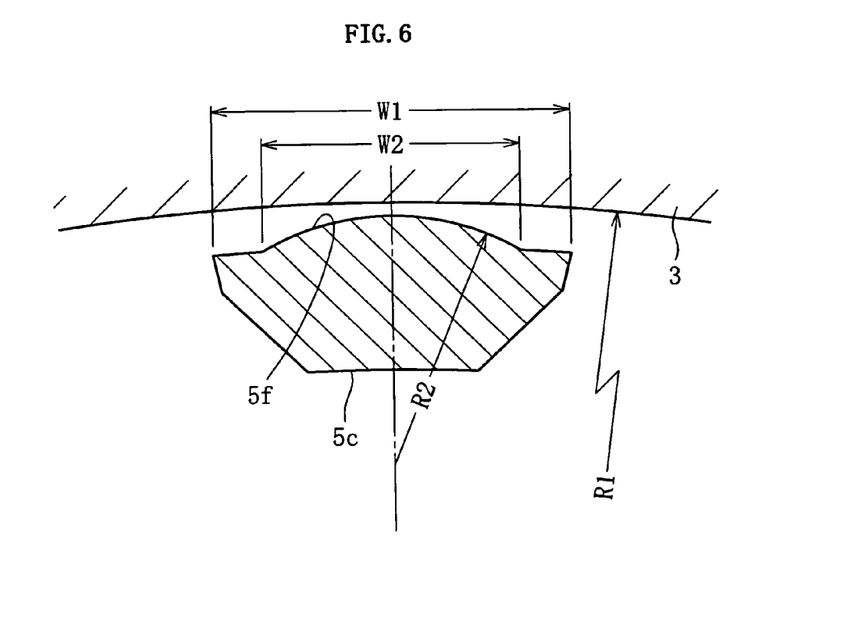
FIG. 6 is a cross-sectional view of a pillar portion of a retainer shown in FIG. 5.

Since the tapered roller bearing 1 shown in FIGS. 5 and 6 is constituted as above, when the bearing 1 rotates to cause the retainer 5 to rotate, a wedge-like oil film is formed between the raceway surface of the outer ring and the projecting portion 5f of the retainer 5. This wedge-like oil film generates a dynamic pressure approximately proportional to the rotation speed of the bearing 1. Therefore, even when the pitch circle diameter (PCD) of the retainer 5 is increased beyond that of the conventional case to bring the retainer 5 closer to the raceway surface of the outer ring, the bearing 1 is allowed to rotate without producing excessive wear and torque loss. Therefore, the number of rollers can be increased without imposing an additional burden.

In the tapered roller bearing of the above embodiment, a large number of indentations having a micro recess-like shape are randomly formed on at least one of the rolling surface and edge surface of the tapered roller and the raceway surfaces of the inner and outer rings (and the larger flange surface of the inner ring of the tapered roller bearing) to thereby form a micro-rough surface. In this micro-rough surface, the surface roughness parameter Rqni of the surface having the indentations is within the range of 0.4 µm≦Rqni≦1.0 µm, and the Sk value is −1.6 or less and preferably within the range of −4.9 to −1.6. Furthermore, the surface roughness parameter Rymax of the surface having the indentations is 0.4 to 1.0. Moreover, when the surface roughness in each of the axial and circumferential directions on the surface is determined and represented by the parameter Rqni, the value of the ratio of the axial surface roughness Rqni(L) to the circumferential roughness Rqni(C), Rqni(L)/Rqni(C), is 1.0 or less. As surface processing treatment for obtaining such a micro-rough surface, a special barrel polishing may be employed to obtain a desired finished surface, but shots or the like may be employed.

In the tapered roller bearing, the rolling surface of the tapered rollers 4 is brought into rolling contact with the raceways of the inner ring 2 and the outer ring 3 during operation, as can be seen from FIG. 1B. In addition, the larger diameter end surface of the tapered rollers 4 is brought into sliding contact with the inner surface of the larger flange portion 2c of the inner ring 2. Therefore, in the tapered rollers 4, a large number of indentations having a micro recess-like shape may be randomly formed on the larger diameter end surface in addition to the rolling surface. Similarly, in the inner ring 2, a large number of indentations having a micro recess-like shape may be randomly formed also on the inner surface of the larger flange portion 2c in addition to the raceway surface.

The measurement method and conditions for the parameters Ryni, Rymax, Sk, and Rqni are exemplified as follows. When the surface characteristics represented by these parameters are measured in components such as a rolling element and a raceway ring of a rolling bearing, a measured value at a single measurement point is reliable as the value at a representative point. However, it is preferable that the measurement be performed at two points, for example, opposed to each other in the diameter direction.

Parameter computation standard: JIS B 0601: 1994 (SUR-FCOM JIS 1994)
Cutoff type: Gaussian
Measurement length: 5λ
Cutoff wavelength: 0.25 mm
Measurement magnification: 10,000×
Measurement speed: 0.30 mm/s
Measurement location: Central portion of roller
Number of measurements: 2
Measurement apparatus: Surface roughness measuring apparatus SURFCOM 1400A (TOKYO SEIMITSU CO., LTD.)

Next, a description is given of life tests performed on conventional tapered roller bearings A and B (Comparative Examples) in which a rolling surface of tapered rollers is finished to a smooth surface, and on bearings C to E (Comparative Examples) and bearings F and G (Examples) in which a large number of indentations having a micro recess-like shape are randomly formed on the rolling surface of the tapered rollers (see Table 1). Each of the bearings A to G employed was a tapered roller bearing having an outer diameter of the outer ring of 81 mm and an inner diameter of the inner ring of 45 mm. Further, the rolling surface of the roller of each of the bearings A and B of the Comparative Examples was processed by being subjected to super finishing after grinding and was not subjected to indentation processing. On the rolling surface of the roller of each of the bearings C to E of Comparative Examples and the bearings F and G of Examples, a large number of indentations having a micro recess-like shape were formed by means of special barrel polishing processing. Furthermore, the Rqni(L/C) of each of the roller bearings C to G was 1.0 or less, and the Rqni(L/C) of each of the roller bearings A and B was about 1.0.

TABLE 1

| Tested bearing | | Average area (µm²) | Ryni (µm) | Areal ratio (%) | Sk | Rqni (L/C) | Rymax | Lifetime (h) |
|---|---|---|---|---|---|---|---|---|
| Comparative Example | A | — | 0.32 | — | −0.9 | — | 0.5 | 11.5 |
| | B | — | 0.41 | — | −0.7 | — | 0.7 | 9.2 |
| | C | 132 | 1.47 | 25 | −4 | ≦1.0 | 1.9 | 15.5 |
| | D | 113 | 1.12 | 19 | −3.2 | ≦1.0 | 1.2 | 50.5 |
| | E | 30 | 0.32 | 6 | −1.8 | ≦1.0 | 0.5 | 19.8 |
| Example | F | 94 | 0.95 | 17 | −2.6 | ≦1.0 | 1 | 129.6 |
| | G | 52 | 0.52 | 8 | −1.8 | ≦1.0 | 0.6 | 200 or more |

Figure 9:
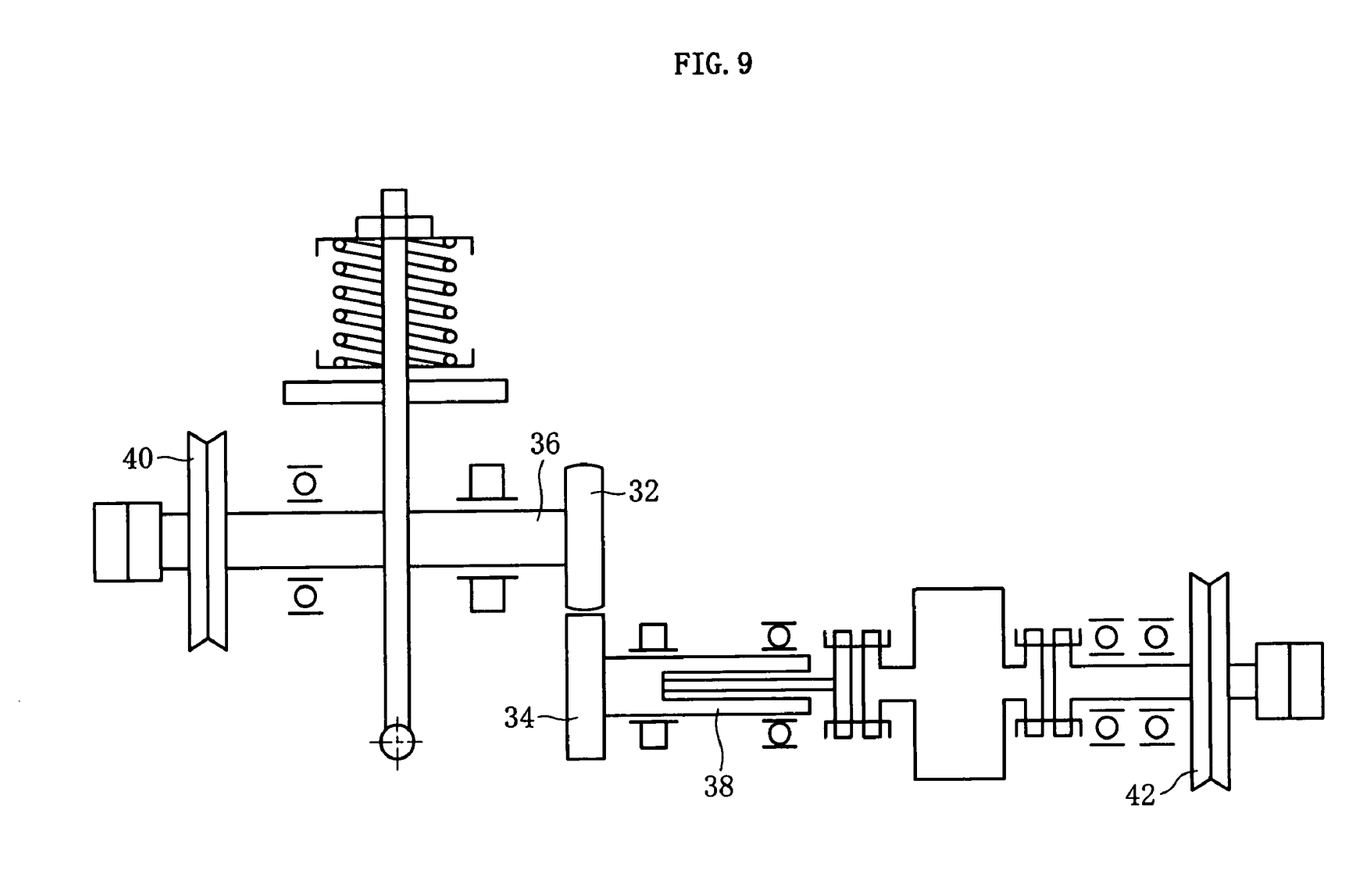
FIG. 9 is a general schematic view of a two-cylinder testing machine.

A peeling test was performed by use of a two-cylinder testing machine shown in FIG. 9 to evaluate a metal contact ratio. In FIG. 9, a driving side cylinder 32 (a D cylinder: Driver) is mounted on an end of one of the rotating shafts, and a driven side cylinder 34 (an F cylinder: Follower) is mounted on an end of the other rotating shaft. The two rotating shafts 36 and 38 can be driven by separate motors through pulleys 40 and 42, respectively. The shaft 36 on the D cylinder 32 side is driven by a motor, and the F cylinder 34 is freely rotated and driven by the D cylinder 32. As for surface treatment, two types of the F cylinder 34 are prepared for the Comparative Examples and Examples. The details of the test conditions are listed in Table 2.

TABLE 2

| | | | |
|---|---|---|---|
| Testing machine | Two-cylinder testing machine (see FIG. 9) | | |
| Driving side cylinder (D cylinder) | φ40 × L12, Minor radius of curvature R 60 SUJ2 standard product with the outer diameter surface being super finished | | |
| Driven side cylinder (F cylinder) | φ40 × L12, straight SUJ2 standard product with the outer diameter surface being super finished | | |
| | Surface treatment | | |
| | | Comparative Example | Example |
| | Average area (µm²) | 145 | 83 |
| | Ryni (µm) | 1.21 | 0.73 |
| | Areal ratio (%) | 20 | 15 |
| RPM | 2000 rpm | | |
| Load | 2156 N (220 kgf) | | |
| Maximum contact pressure Pmax | 2.3 GPa | | |
| Contact ellipse (2a × 2b) | 2.34 mm × 0.72 mm | | |
| Number of loads | 2.4 × 10⁵ times (2 h) | | |
| Ambient temperature | Normal temperature | | |
| Oil feeding method | Oil is fed using a felt pad | | |
| Lubricating oil | JOMO HI SPEED FLUID (VG 1.5) | | |

Figure 10A:
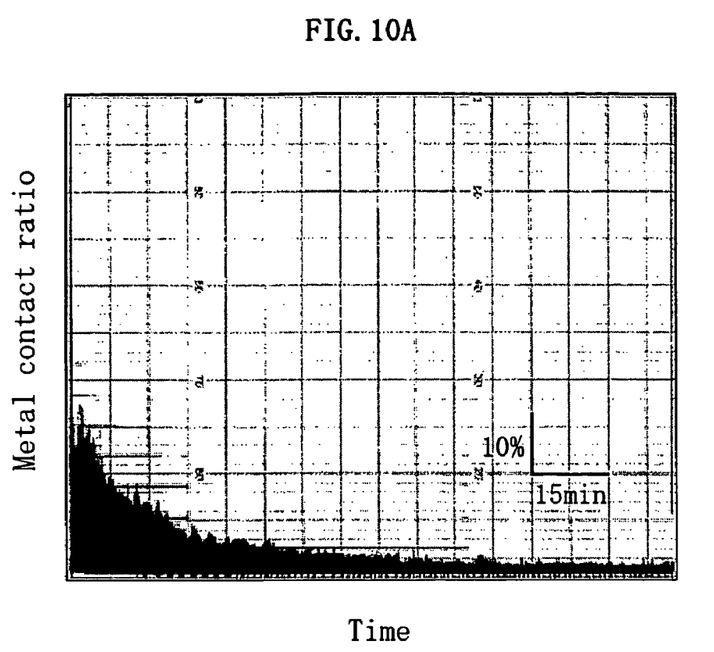
FIG. 10A is a graph showing a metal contact ratio of a comparative example.
Figure 10B:
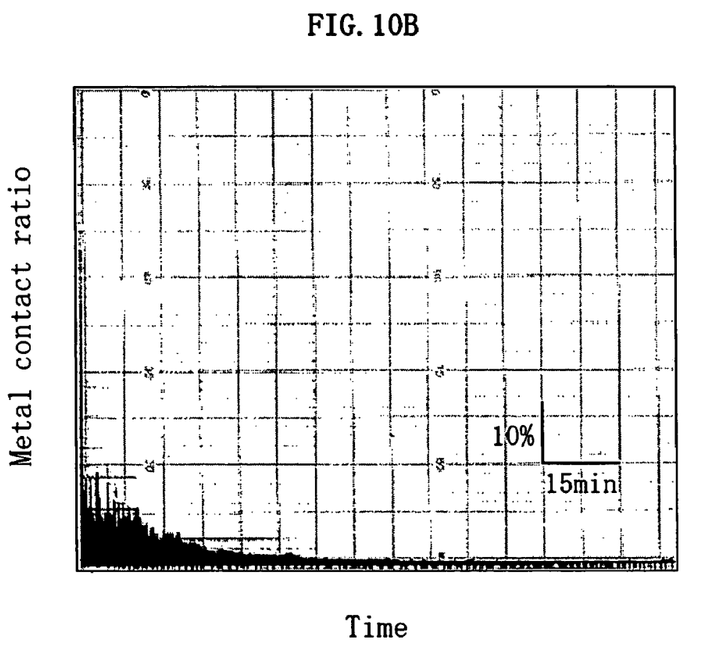
FIG. 10B is a graph showing a metal contact ratio of an example.

FIG. 10 shows the comparison data of the metal contact ratio. In FIG. 10, the horizontal axis represents elapsed time, and the vertical axis represents the metal contact ratio. FIG. 10B shows the metal contact ratio of the rolling surface of the roller of the bearing of the Example, and FIG. 10A shows the metal contact ratio of the rolling surface of the roller of the bearing of the Comparative Example. As is clear by comparing FIGS. 10A and 10B, the metal contact ratio is improved in the Example as compared to the Comparative Example. In other words, an oil film formation ratio (=100%−the metal contact ratio) of the bearing of the Example is improved by about 10% at the time of starting the operation and by about 2% after the test (two hours) as compared to the bearing of the Comparative Example.

The tapered roller bearing according to the present invention can be incorporated into a transmission of automobiles and can be employed in differential gears of automobiles as well as in applications other than gear apparatus for automobiles.

The embodiments disclosed herein are to be considered as in all aspects illustrative but not restrictive. The present invention is defined by the scope of the claims rather than by the description of the foregoing embodiments, and all modifications within the scope of the claims and within the meaning and scope of equivalence of the claims are intended to be included within the scope of the present invention.

What is claimed is:

1. A tapered roller bearing, comprising:
   an inner ring;
   an outer ring;
   a plurality of tapered rollers which are rollably disposed between the inner ring and the outer ring; and
   a retainer which retains the tapered rollers at predetermined circumferential intervals;
   wherein:
   a roller coefficient $\gamma$ exceeds 0.94;
   a number of indentations having a micro recess shape are randomly provided at least on a surface of a rolling element;
   a surface roughness parameter Ryni of the surface having the indentations falls within a range of $0.4 \, \mu m \leqq Ryni \leqq 1.0 \, \mu m$; and an Sk value is $-1.6$ or less.

2. A tapered roller bearing according to claim 1, wherein the retainer is composed of an engineering plastic.

3. A tapered roller bearing according to claim 1, wherein a window angle of a pocket of the retainer is set to 55° or more and 80° or less.

4. A tapered roller bearing according to claim 3, wherein the retainer is composed of an engineering plastic.

5. A tapered roller bearing according to claim 1, wherein, when the surface roughness of the surface having the indentations is represented by a parameter Rqni, a value of a ratio Rqni(L)/Rqni(C) of an axial surface roughness Rqni(L) to a circumferential surface roughness Rqni(C) is 1.0 or less.

6. A tapered roller bearing according to claim 5, wherein the retainer is composed of an engineering plastic.

7. A tapered roller bearing according to claim 5, wherein a window angle of a pocket of the retainer is set to 55° or more and 80° or less.

8. A tapered roller bearing according to claim 7, wherein the retainer is composed of an engineering plastic.

9. A tapered roller bearing according to claim 1, wherein a surface roughness parameter Rymax of the surface having the indentations falls within a range of 0.4 to 1.0.

10. A tapered roller bearing according to claim 9, wherein the retainer is composed of an engineering plastic.

11. A tapered roller bearing according to claim 9, wherein a window angle of a pocket of the retainer is set to 55° or more and 80° or less.

12. A tapered roller bearing according to claim 11, wherein the retainer is composed of an engineering plastic.

13. A tapered roller bearing according to claim 9, wherein, when the surface roughness of the surface having the indentations is represented by a parameter Rqni, a value of a ratio Rqni(L)/Rqni(C) of an axial surface roughness Rqni(L) to a circumferential surface roughness Rqni(C) is 1.0 or less.

14. A tapered roller bearing according to claim 13, wherein the retainer is composed of an engineering plastic.

15. A tapered roller bearing according to claim 13, wherein a window angle of a pocket of the retainer is set to 55° or more and 80° or less.

16. A tapered roller bearing according to claim 15, wherein the retainer is composed of an engineering plastic.

* * * * *